United States Patent [19]

Elliano et al.

[11] 4,170,015
[45] Oct. 2, 1979

[54] TIME CLOCK DEVICE

[76] Inventors: Jack L. Elliano, 9427 Burnet, Sepulveda, Calif. 91340; Michael M. Levin, 6544 Coldwater Canyon Ave., N. Hollywood, Calif. 91606

[21] Appl. No.: 781,564

[22] Filed: Mar. 28, 1977

[51] Int. Cl.² .................. G01D 15/10; G07C 1/06
[52] U.S. Cl. .................. 346/76 PH; 235/92 T; 364/406; 346/82
[58] Field of Search .......... 346/80, 81, 82, 76 R, 346/14, 17, 20, 134, 104; 235/92 T, 92 AC; 364/406, 401

[56] References Cited

U.S. PATENT DOCUMENTS

| | | | |
|---|---|---|---|
| 3,221,150 | 11/1965 | Goodwin | 235/92 |
| 3,341,852 | 9/1967 | Kramer | 346/14 |
| 3,665,165 | 5/1972 | Strandberg | 235/92 T |
| 3,740,759 | 6/1973 | McKeegan | 346/82 X |
| 3,894,215 | 7/1975 | Lotter | 346/82 X |
| 3,991,671 | 11/1976 | Aizawa | 346/76 R X |
| 4,072,850 | 2/1978 | McGlynn | 364/424 |

*Primary Examiner*—Joseph W. Hartary
*Attorney, Agent, or Firm*—Sanford Astor

[57] ABSTRACT

This invention relates to a new time clock system comprising a memory counter which counts seconds, minutes, hours, days, months and years for a 9,999 year period; a microprocessor which controls the counting of the time, which also operates a time display in 7-segment form, a thermal printer which prints the time on heat sensitive paper and finally computes the hours worked of an employee on a weekly or other payroll basis.

5 Claims, 5 Drawing Figures

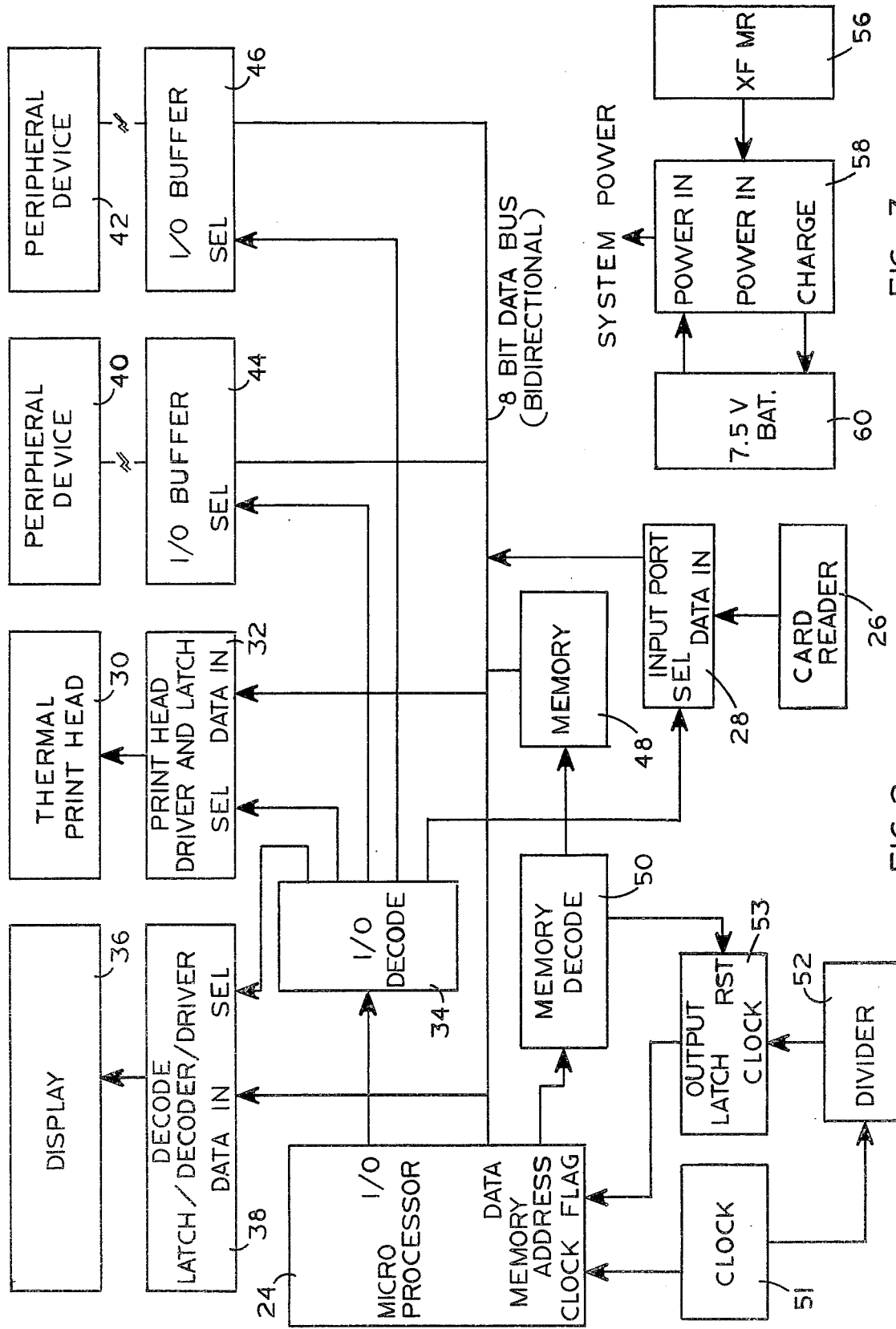

TIME CLOCK DEVICE

BACKGROUND OF THE INVENTION

In approximately 1880 the first time recorder was invented. It used a standard wind-up clock movement to rotate a calibrated disk on which there were numbered push buttons with sharp points to pierce the disk. Pushing the button would indicate the employee and time in or out. The success of this invention prompted improvements such as the printing type wheels and ribbons. These improvements required the use of mechanical devises such as cams, levers, springs and push pawls. In addition to the clock mechanisms for keeping the typewheels on time more sophisticated time recorders evolved as the work force and the need increased.

Large numbers of employees required individual time cards. At this point in time the time clock was a hard working machine. Building such a recorder with heavy steel and brass parts to take the beating, due to many employees, promoted wear and breakdowns no matter how well the parts were manufactured.

The ribbon had to be monitored and changed periodically and the time clock field service man was born at this point.

The cases for the clocks were built of oak and other beautiful hardwood. They were often tall with large pendulums for accuracy. They had design engraving on the faces and outer parts. As the requirement for more time clocks continued the days of fine workmanship and woodwork were nearing a close. Steel cased clocks, small job cost recorders and bell ringing devices arrived. Mass production of compact time recorders of every conceiveable type and use increased.

The time clock continued to print the time and operated with standard mechanical devices not too different in operation from it's 1880 grandfather. The present design of time clocks is basically the same, however, materials for the parts have changed to higher profit items using such things as plastics. The time clock still uses timing motors to push spring loaded levers and pawls to pick up one tooth of a sixty-tooth rachet, then drops off the motor cam to advance the type wheel one minute. This happens every minute of the day. Many other operations are all done with levers, cams, springs and push pawls in a variety of shapes and designs.

The time recorder has always done one basic thing, it has printed the time on a chart or time card. The employee time card is an extremely important piece of information. Most state laws and in addition many union agreements require that hourly employees must have their hours of employment recorded in a manner which can be easily checked. The usual time card has served this purpose for many years. It gives the employee a printed record of his time of arrival and time of departure. In certain legal disputes and labor disputes this printed record is a requirement. However, the printed time-card record produced by the normal time clock is not usable in an automated time worked system. This is because most data processing systems use paper tape or magnetic tape or even punched cards to input the information to a computer. In the processing systems to date, it is necessary for a person to pick up the reel of paper or magnetic tape covering the payroll periods and then process these reels of tape through a computer where the functions of computing the time worked are performed. The only other alternative has been to have a complicated and expensive computer on the premises to perform the time keeping functions as well as the payroll functions.

Thus, a tremendous need exists in the field for a small inexpensive time clock system which both gives a printed time card which is required by law and, contained within itself, keeps a record of the total number of hours worked by an employee during a given pay period without the extraordinary expense of a computer system.

It is an object of the present invention to provide a new time clock recorder device which utilizes no ribbons, no typewheels, no mechanical moving parts, no timing motor, no printing hammer and requires practically no maintenance.

Yet a further object of this invention is to provide a recording time clock which automatically changes the month and date, on which a reset for a power failure is not necessary, and which within itself calculates the total hours worked for a given pay period, such as a week, for each employee.

As stated above standard methods of time printing by standard time clocks use a mechanical device consisting of type wheels together with an ink ribbon and a solenoid actuated hammer type assembly to print the time, controlled by a special clock timing motor linked to the printing type.

Mechanisms are used to trigger the print, wind the ribbon and transfer the proper sequence timing to the hour, data and day of each type wheel.

The month type wheel is always manually set as mechanical spring and lever principals that would comprehend the odd day of ammonth would be too complicated to manufacture.

The standard time clock unit is subject to constant abuse by itself due to its own design. Hammering and rubbing itself to pieces, it must be maintained as any mechanical unit must. Inevitably it will need replacement or major overhauling to guarantee troublefree use, which as a general rule costs about fifty percent of replacement cost. Also, once the standard time clock has printed the time on the time card, the total time worked by an employee in a given pay period must be computed by an individual employee bringing in human error.

While some computers have been developed which keep such records and thus compute weekly payroll totals these computers are extremely expensive and practical for only large corporations, and they keep date on a magnetic or paper punch tape. The cost of these computers, however, is out of reach to the average small business employer. It is a further object, therefore, of the present invention to provide a low cost time record device which in addition to the previous benefits heretofore states is inexpensive enough to be readily affordable by small businesses, for instance those who employ only 25 to 125 employees, who cannot possibly afford a computer system.

These and other objects will be obvious from the following description together with the enclosed drawings in which:

FIG. 2 is a block diagram of the control system utilized to operate the time clock mechanism of the present invention.

Figure 1:
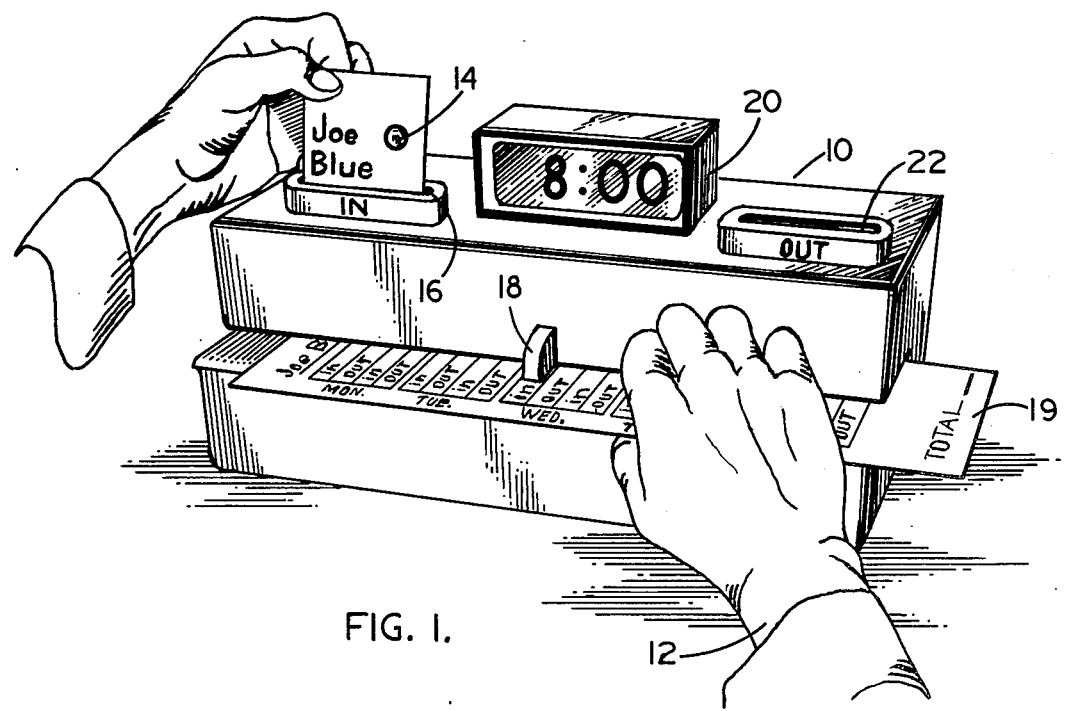
FIG. 1 is an illustration of the print-time clock mechanism of the present invention.

Referring now to FIG. 1 there is shown an illustration of the use of the time clock portion 10 of the present invention which is visable to the user and which is used by the employee for punching his time card. This time clock portion 10 is the only portion of the invention which is visible to the employee. The remainder of the control system inside of the visible clock 10 will be described more specifically in detail with reference to FIG. 2. In order to use the time clock of the present invention and in order to input the information into the system the employee 12 will insert a special coded card 14 into a slot 16 in the time clock 10. The special coded card 14 will carry a specific code for the specific employee 12 using the device, therefore the information which is input into the system will be specific for the specific employee. After inserting his coded identity card 14, the employee also inserts a time card 19 on which the time clock prints the specific time that the employee is either checking in or checking out. The location on the time card on which the in or out time is printed is indicated by a print position indicator 18. The exact time of day is constantly displayed in a time display register 20. Another slot 22 is utilized at the end of the day when the employee 12 is checking out or leaving work. He then places his coded identity card 14 into slot 22 and the time clock will register that he is leaving for the day, and again print that time on the time card 19.

The information as to the exact time that the employee arrives at work and punches his time card and the information as to the exact time the employee checks out, leaves work and punches his time card is inserted into a system for processing as more fully described with reference to FIG. 2 and this is accomplished at the same time that the time is printed on the time card 19.

The time card 19 is manufactured from thermographic paper, that is, a paper on which printing takes place by the application of heat. This thermographic paper is well known in the art and is manufactured by many manufacturers such as 3-M and NCR. The printheads that are located inside of the time clock 10 are thermal printheads which are adapted to record and print letters and numbers on thermographic paper. These thermal printheads are also well known in the art and are manufactured by many manufacturers such as Gulton. The particular size required for the printhead and the heat sink utilized in a particular clock depends upon the thermographic paper to be used and the printing rate. This type of thermal printing is quite common in today's printing calculators and the tremendous advantage of the thermal printing is that it is not necessary to have ink or a ribbon of any kind because the paper is printable by the application of the heat in the thermal printheads. Therefore, there is no mechanism to be maintained for advancing of ribbons, application of ink, or the use of a hammer effect, which is now quite common in time clocks.

Referring now to FIG. 2 there is shown a block diagram of the control operation of the time clock of the present invention in which a card reader 26 is indicated for input of information. Control of the device of the present invention is operated by a micro processor 24 and its associated hardware. The micro processor is well known in the art and manufactured by many companies such as RCA. The micro processor 24, with it's related memory and periferal chips, which basically are used for inputting and outputting data, control the function of the entire machine.

When an employee places his identification card 14 on his time card 19 into the card reader 26 (10 of FIG. 1) the data passes through input port 28 into the micro processor 24. While in the embodiment shown, the identification card and the time card are shown as two separate cards, the system can be designed so that both operations take place on a single card. That is, the employee can be given an identification card which when placed into the card reader 26 identifies the particular employee and prints the time on the same card, if this is desired.

The micro processor operates a number of functions including a thermal print head 30 operated by a print head driver and latch 32. The I-O decode 34 selects the particular function or output port that the micro processor will operate such as the thermal print head 30. The micro processor also controls a display 36 which can be used to display the time of day on a continual basis. A decode latch-decoder-driver 38 operates the display mechanism.

Other periferal devices 40 and 42 can be operated through I-O buffers 44 and 46 so that the micro processor can operate other sorts of output devices as is required, such as ringing of bells at a particular time.

By use of the employee code, the time checked in or time checked out, when the card is inserted by the employee, is inserted into the memory 48 of the device through memory decode 50. As the time is being printed on the thermo graphic time card 19, inserted by the employee, the memory 48 is adding the time worked for the employee to the total already contained in the memory 48 so that a total is kept within the system on a weekly or other payroll basis. The employee code can consist of, for instance, an actual key with various slots cut in it to identify the employee or a card with holes or slots punched into it. In this way the machine not only functions as a time clock but as a complete data logging system which totalizes the employee's total working hours in a given week or bi-weekly pay period. In order to find out what the total time worked by an employee is, in a given pay period, a coded card is inserted into output the total time and print it on the employee's thermal time card, or on other thermal paper inserted for that purpose.

This would output the data telling the person in charge of payroll how many hours an employee had for that pay period and then allow that employee's time to be reset independently of all the other employees.

Thus, several different payroll periods could be used internal to one company such as the first and third week of the month pay and a second and fourth week pay for a bi-weekly pay schedule as well as intermixing weekly and bi-weekly schedules for one time clock without any associated confusion.

The time display 36 displays the time constantly. Referring to FIG. 3 the time is displayed even during a power failure by means of a battery backed system in that the entire micro processor and its associated periferal chips and the clock run independently of the line voltage by means of a gel type rechargeable battery 60. This battery 60 is automatically recharged by control 58 and transformer 56 during normal operating mode and will discharge and supply power to the system during a power-down condition.

This device functions not simply as a conventional periferal solid state device to attach to a master computer but rather is a complete, self contained, very small enclosure unit for taking care of employees' payroll, and other functions which can be attached through periferal devices 40 and 42 to perform functions such as bell ringing or turning lights on and off at specific times of day.

The time is computed in the system by a 2.097152 MH$_z$ crystal oscillator 51 and divider 52 which oscillates at one cycle every second. This 1 H$_z$ signal operates a set of counters in the memory which counts seconds, minutes, hundreths of hours, hours, days, months and years. It also keeps tract of leap year, thereby making the resetting of the clock to take care of things such as leap year totally unnecessary for a tremendously long period of time at least 9,999 years. All time clocks now in existence must be continually reset to take care of the varying number of days that there are in different months of the year.

In basic functioning of the data logging, when an employee places his code identification card in the machine either in the in slot or out slot, indicating which he is doing, the machine loads a register with the time in. Upon punching out, the machine will put into its memory the time out. It will then proceed to subtract the time in from the time out and arrive at a number which is the equivalent of the number of hours worked. The next time he punches in, again his time in will be loaded to a register and when he punches out the additional time computed upon the subtraction of the two times will be added to the previous total already present in the memory of the machine. The recap function of the machine which is the outputting of the memories which contain and add the employee's weekly totals will consist of an array of memory chips which will be in a small system to be adequate for the number of employees at the company and can be expandable by adding additional chips. The outputting function will place the contents of the employee's allocated memory location containing the hourly totals into an external module which could consist of a readout display or by inserting the employee's time card or other coded card into the machine it could punch out the total time right on the time card.

The unique advantage of this system and this device is that it is a very small self-contained unit. The device functions as an employee time clock and yet automatically performs all of the functions of the complete bookkeeping system within the time clock itself. The machine itself is no larger physically than a standard mechanical time clock. The device has implications outside of simply computing the hours worked by an employee. For instance, in a job program in which it is important to compute the number of hours worked during the day on a particular function or a particular job, each employee could have a series of job cards with special job codes so that when the employee started a particular job he could punch the card with a job card having a particular job code. When he completed this job he again punches the card and so the device would keep a calculation of the total time worked on a particular job. This information could then be stored and read out at the end of a specified period.

Having thus described the invention I claim:

1. A self contained time clock, recorder device which contains no moving parts for use with a time card and a coded identification card combination comprising a crystal and crystal oscillator for counting seconds, a microprocessor contained within said time clock adapted to convert the counting to years, months, days, hours, minutes and seconds, a time display activated by the microprocessor, input means for the time card and coded identification card, a memory contained within said time clock activated by the microprocessor, a thermal print head for printing of output data, said time clock device adapted to input to the microprocessor the time in and time out for each employee upon insertion to the input means of a time card and a coded identification card, the microprocessor totaling the hours worked for each employee from the input data and storing the individual employee total hours worked in the memory, and reading out the total hours worked by input of a code to the input means thereby activating the memory to print out by the thermal print head onto the time card the total hours worked for each employee.

2. The device of claim 1 wherein the time card is manufactured from thermographic paper adapted to be printed by the thermal print head.

3. The device of claim 1 wherein the thermal print head is activated by the micro processor in such a manner that it prints the time shown on the time display on thermographic paper.

4. The device of claim 1 comprising means to ring bells at preset times.

5. The device of claim 1 comprising means to activate lights at preset times.

* * * * *